United States Patent [19]

Campbell et al.

[11] Patent Number: 4,785,765

[45] Date of Patent: Nov. 22, 1988

[54] METABOLIC CAGE UNIT FOR A LABORATORY ANIMAL

[75] Inventors: Neil E. Campbell, Hasbrouck Heights; John V. Oldham, River Vale, both of N.J.

[73] Assignee: Lab Products, Inc., Maywood, N.J.

[21] Appl. No.: 914,901

[22] Filed: Oct. 3, 1986

[51] Int. Cl.[4] ............................................. A01K 1/03
[52] U.S. Cl. ..................................................... 119/17
[58] Field of Search .................................... 119/15, 17

[56] References Cited

U.S. PATENT DOCUMENTS

| | | | |
|---|---|---|---|
| 2,684,051 | 7/1954 | Leblond et al. | 119/17 |
| 3,107,650 | 10/1963 | Cass | 119/17 |
| 4,154,196 | 5/1979 | Gass | 119/17 |
| 4,322,862 | 4/1982 | Beuthling | 6/5 |

*Primary Examiner*—Robert P. Swiatek
*Attorney, Agent, or Firm*—Blum Kaplan

[57] ABSTRACT

A laminar diffuser for use in a metabolic cage unit. The laminar diffuser includes an inclined serrated linear ramp which directs the urine to a urine collection vessel, and by its configuration, transports the feces past the urine collection vessel to a feces collection vessel, without mixing therebetween.

30 Claims, 4 Drawing Sheets

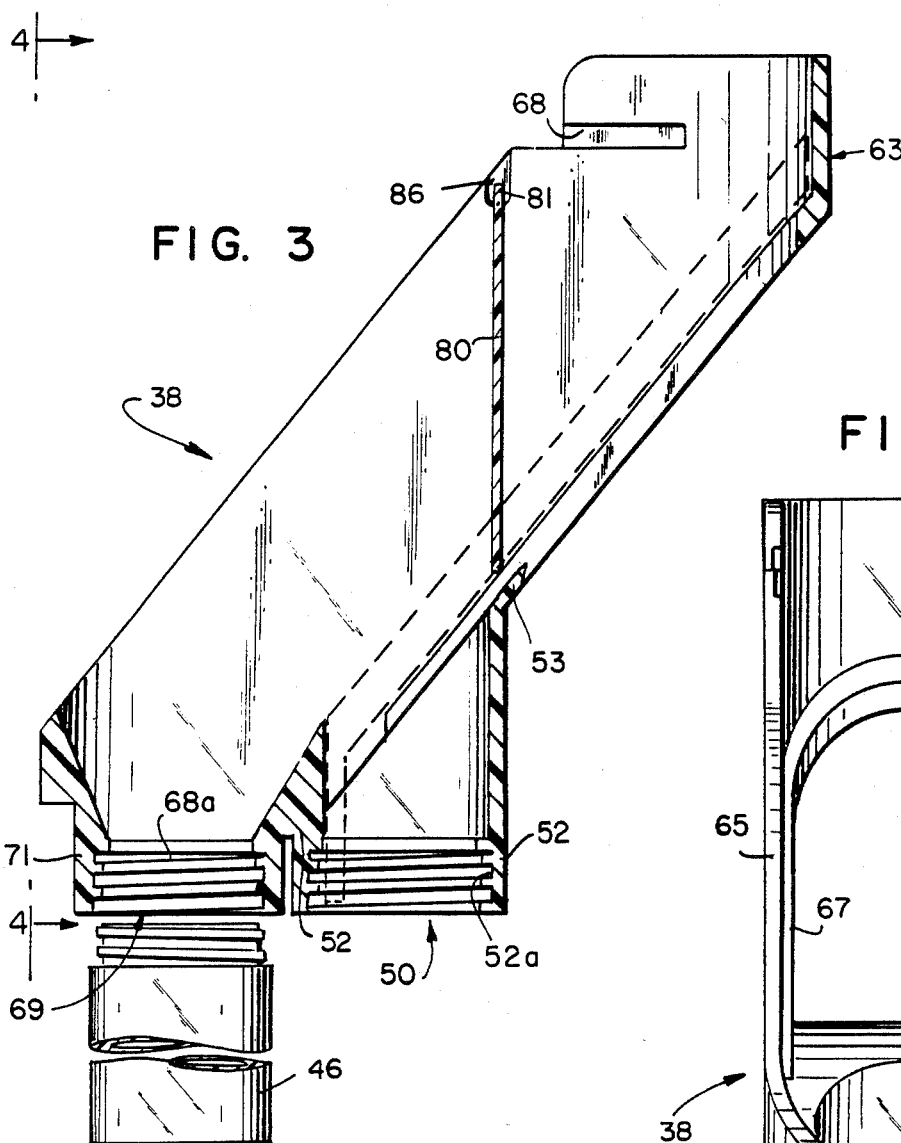
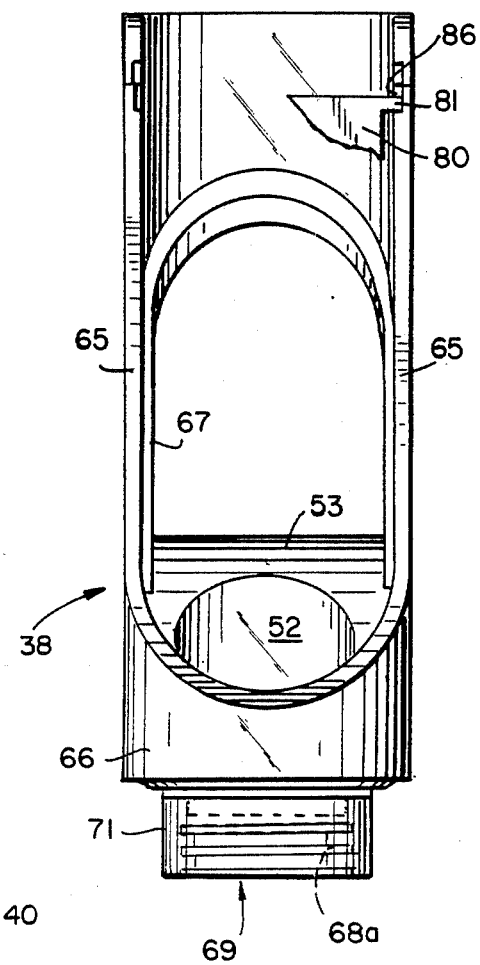
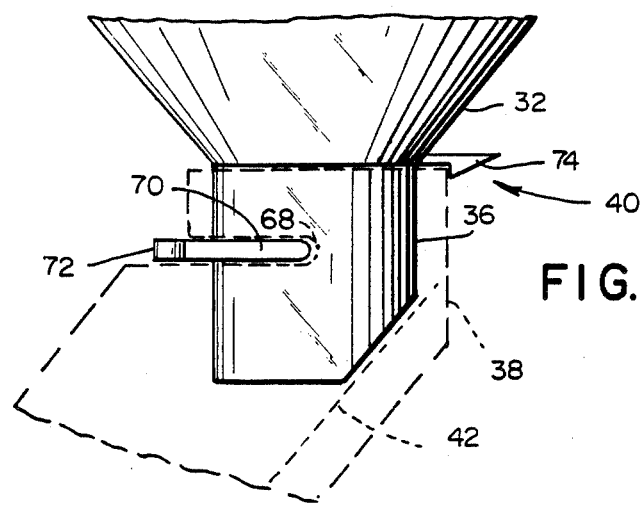

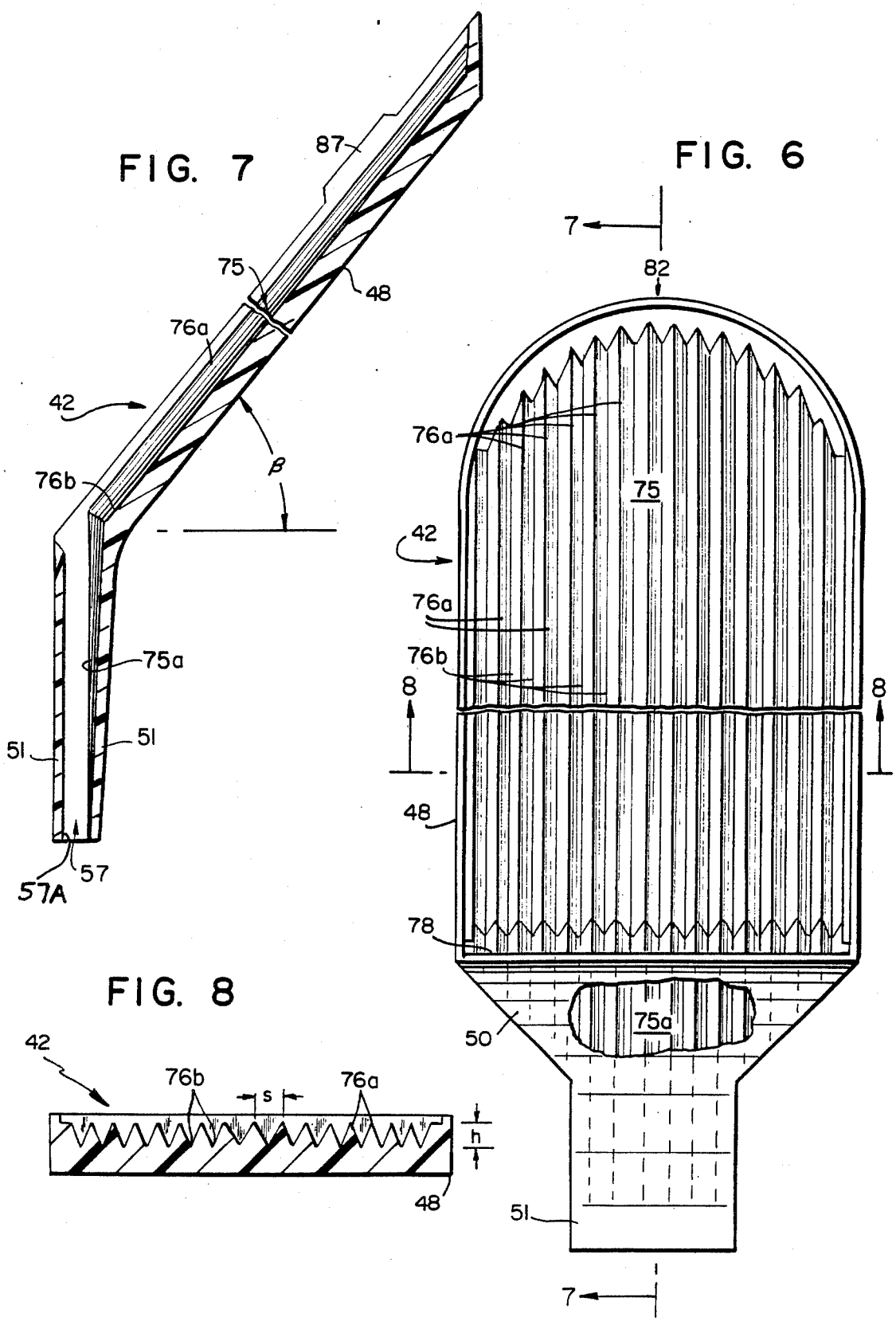

METABOLIC CAGE UNIT FOR A LABORATORY ANIMAL

BACKGROUND OF THE INVENTION

The present invention relates to research laboratory equipment and, particularly, to a novel and improved laminar diffuser for use with a metabolic cage for collecting and separating feces and urine excreted by laboratory animals.

Many laboratory experiments require the use of laboratory animals of varying sizes and types, such as mice and rats. The laboratory animals are kept in isolated environments, known as metabolic cage units, wherein their intake of food and water is carefully measured and controlled. Additionally, in such experiments, it is necessary to collect excreted material from the laboratory animals, and it is often necessary to separate that material into solid (fecal) and liquid (urine) components. Collection of separate samples of feces and urine requires essentially complete separation of the excreted material, preferably as it is produced.

One type of metabolic cage unit which attempts to separate feces and urine is manufactured and sold under the trademark NALGENE by the Nagle Company of Rochester, N.Y. This device includes a cage in which a laboratory animal, usually a rodent, is retained. The cage includes means for providing food and water to the rodent. A wire bottom permits excreted material to pass freely. The excreted material falls onto an inverted cone, which is intended to act as a separator of the feces and urine. A globe having a conductive tube at its bottom surrounds the cone. The conductive tube opens slightly from top to bottom having therefor the appearance of an inverted funnel, and is connected to a urine ring. The urine ring, in turn, is connected to a urine collection tube. A feces collection tube is suspended in the middle of the lower end of the conductive tube.

In theory, at least, feces bounce off the cone, and then down and around the globe toward the conductive tube. The feces should then bounce free of the globe, and fall into the intended collection tube. The urine, is intended to flow along the diverging surface of the cone, to drip onto the interior surface of the globe, and to continue to flow along the interior surface of the globe until it reaches the upper end of the conductive tube, which, as stated, opens downwardly therefrom. Due to the high viscosity of the urine, it should continue to flow along the diverging interior surface of the conductive tube, even through the conductive tube is open directly underneath the flow surface, and be entrained along the interior surface of the conductive tube until it reaches the urine collecting ring, whence it is delivered to the urine collecting tube.

This separation technique relies on the theoretic perception that rodent feces are usually quite hard, and almost pellet-like, and so bounce freely off the hard surfaces of the unit, while the high-viscosity liquid urine flows along the interior of the conductive tube. However, in practice, the separation obtained by such a structure is less than completely satisfactory because a substantial amount of mixing of urine and feces occurs.

Another known configuration is described in U.S. Pat. No. 3,227,139, and manufactured by Maryland Plastics, Inc., of Federalsburg, Md., under the trademark ECONO-METABOLISM UNIT. This configuration includes a cage having food and water for the rodent retained therein. The bottom of the cage is a wire mesh positioned over a collection funnel. Suspended in the middle of the funnel is an inverted cone, which does not serve as a separator, but instead prevents any excreted material from falling directly through the opening of the funnel. The opening of the funnel leads to a bulb suspended therebeneath. A urine collection receptacle is positioned below the bulb.

The operation of this device is similar to that of the NALGENE device, in that the excreted material is directed to the bulb and, in theory, the feces bounce off the bulb, while the urine flows along its surface to the urine collection receptacle. The feces are then intended to bounce to an open area, from which they may be collected, while the urine is collected in the desired receptacle.

The practical operation of this configuration is also lacking, since it does not always collect all the urine in the urine collection receptacle, and some feces may fall therein. Additionally, during prolonged or excessive urination, the urine does not flow continually along the bottom of the bulb, but splashes into the feces collection area. While this device may work satisfactorily with a small mouse, it is unsatisfactory with a larger laboratory animal, such as a large (150 gram) rat, due to the relatively high volume of urine excreted by such laboratory animals.

SUMMARY OF THE INVENTION

Generally speaking, the instant invention is directed to a metabolic cage unit for a laboratory animal having a cage for housing the laboratory animal. A collection funnel is disposed below a membranous floor of the cage to direct urine and feces excreted by the laboratory animal onto a laminar diffuser having an inclined serrated linear ramp which directs the urine to the urine collection vessel, and supports the feces over the urine collection vessel to the feces collection vessel, without mixing therebetween. Pitch of the serrations and the angle of inclination of the ramp effect separation.

According to an exemplary embodiment of the invention, there is provided a laminar diffuser for separating urine and feces excreted by a laboratory animal. The laminar diffuser includes a linear ramp, the ramp defining an axis from a first end thereof to a second end thereof (the axis being inclined at an angle from the horizontal effective to urge the urine and feces to travel downward thereon). The linear ramp includes a series of serrations extending parallel to the axis. The serrations having a pitch, the points of which support the feces and permit the urine to move therebetween, whereby the urine is permitted to pass into the urine port and the feces is transported over the urine port for separate collection from the urine thereby effecting waste separation.

Accordingly, an object of the invention is to provide a metabolic cage unit for laboratory animals which overcomes the drawbacks of the prior art.

A further object of the invention is to provide a metabolic cage unit for laboratory animals which is capable of improved separation of urine and feces.

Still a further object of the invention is to provide a metabolic cage unit for a laboratory animal which has fewer components than known devices, and is easy to clean.

A still further object of the invention is to provide a metabolic cage unit for laboratory animals which is adaptable for efficient use with a variety of sizes of laboratory animals.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is an enlarged sectional view of the separator body of the metabolic cage unit depicted in FIG. 1;

FIG. 4 is a front elevational view of the separator body of FIG. 3;

FIG. 5 is a fragmentary illustration of FIG. 2, showing the connection between the separator body and a collection funnel;

FIG. 6 is a front elevational view of a laminar diffuser of the metabolic cage unit of FIG. 1;

FIG. 7 is a sectional view taken along line 7—7 of FIG. 6; and

FIG. 8 is a sectional view taken along line 8—8 of FIG. 6.

DETAILED DESCRIPTION OF THE PREFERRED EMBODIMENT

Figure 1:
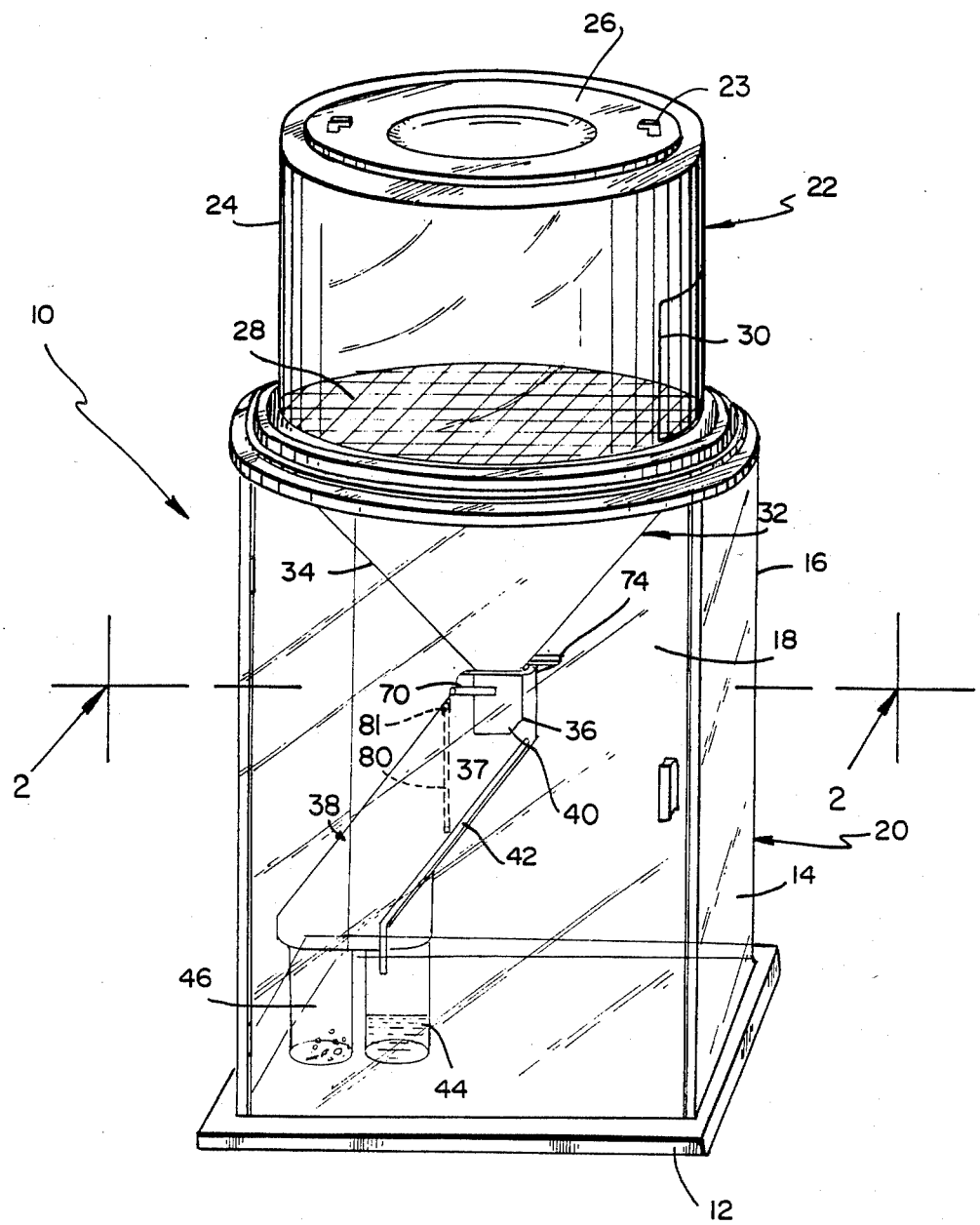
FIG. 1 is a perspective view of a metabolic cage unit for a laboratory animal in accordance with an embodiment of the invention.
Figure 2:
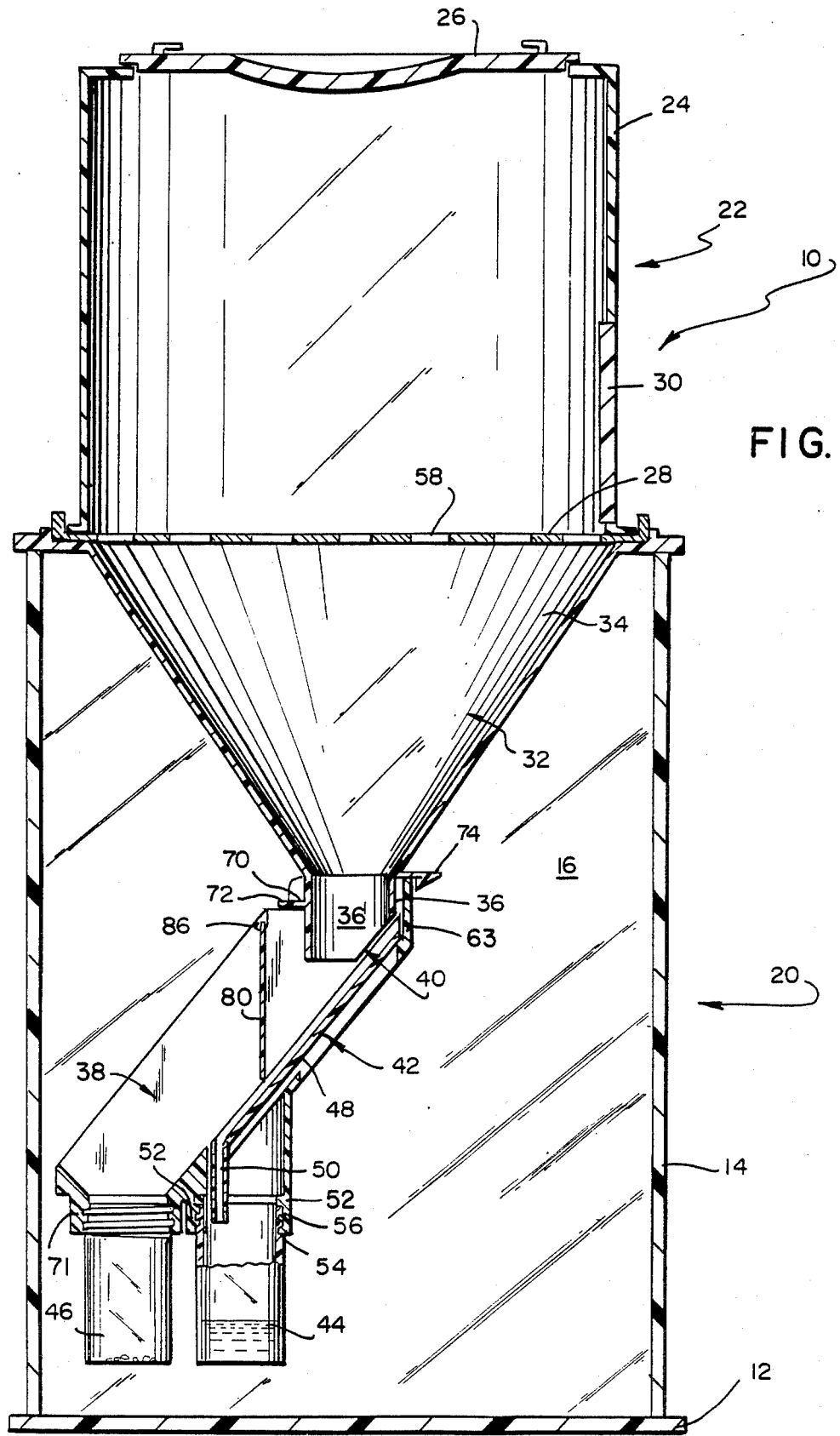
FIG. 2 is a sectional view taken along line 2—2 of FIG. 1.

Referring first to FIGS. 1 and 2, a metabolic cage unit, generally indicated at 10, is depicted. The unit includes a base 12, from which three walls 16, preferably transparent, extend upwardly. A door 18, also preferably transparent, closing a fourth side, defines a housing 20 to the interior to provide access to the housing. It has been found that a frame can be used to support the unit and that the glass walls and the base depicted in FIG. 1 can be omitted to facilitate access to the assembly.

A cage 22 is disposed atop housing 20. Cage 22 includes a generally cylindrical exterior wall 24, a lid 26, and a wire mesh floor 28. There may also be provided conventional means for providing food and water (not shown) to a laboratory animal (also not shown) within cage 22. Lid 26 is removable from the remainder of cage 22, and may also include one or more conventional latches 23 for retaining it in place. These elements of cage 22 are well known and understood in the art and, therefore, are not described in further detail.

Wire mesh floor 28 is preferably of sufficient strength to support laboratory animals and has perforations of sufficient size to permit substantially all material excreted by the laboratory animals to pass therethrough. Although any convenient material, including metal and plastic, may be used in wire mesh floor 28, in an exemplary embodiment, a stainless steel wire mesh floor is utilized.

A removable collection funnel 32 is affixed at its upper end to the bottom of cage 22 by slots and tabs. A conical portion 34 of collection funnel 32 leads to a cylindrical lower end 36 defining an opening 40 disposed concentrically with respect thereto.

A separator body 38 is disposed in fluid communication with the opening 40 in the lower end 36 of collection funnel 32. Separator body 38 includes therein a laminar diffuser 42. A urine collection vessel 44 and a feces collection vessel 46 are releasably secured to the separator body.

Referring to FIGS. 2 through 5, the lower end 36 of collection funnel 32 includes a coupling flange 70 projecting from the lower end. Coupling flange 70 includes stops 72. Separator body 38 includes a U-shaped wall 63 defining a connecting collar that is configured to wraparound cylindrical lower end 36 of funnel 32. Two recessed slots 68 are disposed on opposite insides of the connecting collar and are adapted to receive therein flange 70. Accordingly, separator body 38 is secured to the lower end of collection funnel 32 by inserting the connecting collar around cylindrical lower end 36 so that flange 70 is inserted into recessed slots 68 in the separator body. Stops 72 insure that opening 40 is properly positioned and aligned with the separator body.

Referring specifically to FIGS. 3 and 4, U-shaped wall 63 extends into side walls 65 along the length of both sides of the separator body. Opposed side walls 65 terminate in a semicircular end wall 66. A shoulder 67 extends in parallel down side walls 65 and U-shaped wall 63. U-shaped walls 63 and side walls 65 provide a seat for receiving, supporting and defining an interference fit with laminar diffuser 42.

End wall 66 of the separator body is semicircular and has projecting therefrom a threaded circular orifice 68a. Threaded orifice 68a defines a feces port 69 for receiving feces collection vessel 46. A urine port 50 is formed by a circular orifice 52 and floor 53. Circular wall 52 includes threaded recesses 52a for receiving the threaded urine collection vessel 44.

Laminar diffuser 42 is particularly illustrated in FIGS. 6 through 8 and includes linear ramp 48 and a urine tube 57 which are integrally formed. Ramp 48 includes a serrated surface, generally indicated at 75, formed by elongated ramps 76a and channels 76b.

Urine tube 57 includes a rectangular cross-sectioned wall 51, one surface thereof having a serrated port surface 75A extending along the length thereof. Urine tube wall 51 defines urine opening 57A. As is best illustrated in FIG. 7, tube wall 51 is disposed at an angle with respect to ramp 48 so that urine tube 50 is vertically oriented when laminar diffusers 42 are disposed in separator body 38. As will be explained below, ramp 48 is disposed at an angle $\beta$ with respect to an imaginary horizontal plane to effect suitable separation in accordance with the instant invention.

The plane of linear ramp portion 48 is inclined with respect to horizontal by an angle $\beta$. The magnitude of angle $\beta$ depends on the type, and particularly the size of the experimental animal. It has been found that a combination of angle $\beta$ and the pitch s of serrations 75 may be selected which provides satisfactory separation of feces and urine for laboratory animals ranging from a weanling mouse having a weight of as little as 10 grams to an oversized rat having a weight of as much as 1,200 grams. With wider pitch or spacing s of serrations 75, a larger value of angle may be employed. Similarly, with a narrower pitch s of serrations 75, a shallower angle must be used. With a pitch s of serrations 75 equal to 0.09375 inches, an angle a from 40 to 60 degrees may be used. The more preferred values for angle a are from 45 to 55 degrees and the most preferred value is 50 degrees.

The pitch s and height h (FIG. 8) of serrations 75 are preferably about equal.

Excreted material landing on laminar diffuser 42 is urged by gravity downwardly along linear ramp portion 48. The fluid urine falls into the elongated channels 76b between the ramps 76a, which conduct the urine to urine port 50, and thereby into urine collection vessel 44 (FIG. 2). The generally solid feces pellets remain supported on the ramps 76a of serrations 75, and are thereby conducted over urine port 50, and, hence, through feces port 69 into feces collection 46 (FIG. 2).

The overall operation of metabolic cage unit 10 will be understood with reference to FIG. 2. When the laboratory animal, housed in cage 22, excretes urine and/or feces, the excreted material passes through gaps 58 in wire mesh floor 28, and then contacts the interior surface of collection funnel 32. Gravity then causes the excreted material to pass down the sides of collection funnel 32, to the lower end 36. After reaching lower end 36, the excreted material falls onto laminar diffuser 42, which acts to separate the feces and urine excreted by the laboratory animal in a manner described in more detail below.

Laminar diffuser 42 conducts the excreted urine through urine port 50, and into urine collection vessel 44. The excreted feces roll or slide over the urine port 50, and onto angled ramp portion 52. From there, the feces are directed into feces collection vessel 46.

Once separately collected, the urine and feces may be removed by unscrewing urine collection vessel 44 and/or feces collection vessel 46 from their respective corresponding threads 56. This may be accomplished without disturbing the laboratory animal, since the collection is performed at a location remote from cage 22.

A deflector gate 80 (shown in a fragmentary view in FIG. 4) is suspended by opposed bosses 81 fitted into a pair of vertical slots 86 in separator body 38 downstream of lower end 36. Deflector gate 80 prevents animal excretory material deposited directly over lower end 36 of collection funnel 32 splashing from laminar diffuser 42 directly into feces collection vessel 46. Such splashing would undesirably contaminate the collected feces with urine and would also lessen the collection of urine. After striking deflector gate 80, the excretory material bounces or drips to the surface of laminar diffuser 42, whereafter it follows the normal separation procedure. Deflector gate 80 is long enough to extend to within close proximity to the upper surface of laminar duffuser 42. In one embodiment, the spacing between the bottom of deflector gate 80 and the top of laminar duffuser 42 is 0.187th inches.

Deflector gate 80 may be made of any convenient material such as metal or plastic. In a preferred embodiment, deflector gate 80 is a disposable waxed chipboard material, the replacement of which, between experiments, eliminates the need for sterilization. Bosses 81 are preferably tabs integrally formed at the top of the deflector gate.

A splash tab 87 extends up from each side of linear ramp portion 48 alongside lower end 36 of conical body 34 to prevent solid or liquid material deposited directly over lower end 36 from splashing over the side of linear ramp portion 48.

For each cleaning, the non-throwaway components of the metabolic cage unit 10 are preferably made of an autoclaveable material which is durable, relatively inexpensive and easy to manufacture. Injection-molded resins have been found to be acceptable materials. Acrylics or polycarbonates, for example, may be used without departing from the spirit and scope of the invention. Laminar diffuser 42, for example, may be made of stainless steel for durability with the ability to withstand sterilization. As an alternative, sterilization may be omitted by using low-cost disposable material.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A laminar diffuser for separating urine and feces excreted by a laboratory animal, said laminar diffuser comprising a linear ramp; said linear ramp defining an axis from a first end thereof to a second end thereof; said axis being inclined at an angle from horizontal effective to urge said urine and feces to travel downward thereon; said linear ramp including a series of serrations extending parallel to said axis; a urine tube is disposed in said second end, a urine port communicating with said urine tube said urine port being defined at an angle with respect to said linear ramp so that said urine passes into said urine tube and said feces are transported over said urine tube for collection separate from said urine when said urine tube is oriented in a substantially vertical position.

2. A laminar diffuser, as claimed in claim 1, wherein said serrations have an effective pitch for supporting said feces and for permitting said urine to move therebetween.

3. A laminar diffuser, as claimed in claim 1, wherein said angle is from approximately 40° to approximately 60° degrees with respect to a horizontal plane.

4. A laminar diffuser, as claimed in claim 3, wherein said effective pitch is approximately 0.093 inch.

5. A laminar diffuser, as claimed in claim 4, wherein said angle is from approximately 45° to approximately 55°.

6. A laminar diffuser, as claimed in claim 1, wherein at least a portion of said series of serrations extends from near said first end of said linear ramp to near said second end thereof.

7. A laminar diffuser, as claimed in claim 1, wherein the height of each of said serrations of said linear ramp is about equal to the pitch of said serrations.

8. A laminar diffuser, as claimed in claim 7, wherein said height and said pitch are each approximately 0.093 inch.

9. A laminar diffuser, as claimed in claim 1, and including a deflector gate vertically disposed proximate said ramp to intercept animal excrement bouncing from said linear ramp and to return said animal excrement to a surface of said linear ramp.

10. A metabolic cage unit for a laboratory animal comprising means for receiving material excreted by said laboratory animal; said material including feces and urine; said laminar diffuser for separating said feces and said urine; said laminar diffuser including an angled serrated ramp including a series of serrations, said serrations having an effective pitch for supporting said feces and for permitting said urine to move therebetween, said peak to peak distance of each of said serrations being about equal to the height of each said serration; said angled serrated ramp including means for permitting said urine to discharge therefrom and for conducting said feces to a separate feces collecting location, whereby said urine is separated from said feces.

11. A metabolic cage, as claimed in claim 10, wherein said angled serrated ramp includes a plurality of serrations which extend generally from a first end of said serrated linear ramp to a second end thereof.

12. A metabolic cage, as claimed in claim 11, wherein said means for permitting includes serrations having a predetermined value of pitch and the angle of said ramp having a corresponding value.

13. A metabolic cage according to claim 10, wherein said angled serrated ramp is inclined at an angle of from about 40 to about 60 degrees from horizontal.

14. A metabolic cage, as claimed in claim 13, wherein said angle is from 45 to 55 degrees.

15. A metabolic cage, as claimed in claim 10, further comprising a deflector gate, operatively disposed over above said angled serrated ramp in a position to intercept said material bouncing from said angled serrated ramp and for returning said material to said angled serrated ramp.

16. A metabolic cage unit for a laboratory animal comprising means for receiving material excreted by said laboratory animal; said material including feces and urine; a laminar diffuser for separating said feces and said urine; said laminar diffuser including an angled serrated ramp; said angled serrated ramp including means for permitting said urine to discharge therefrom and for conducting said feces to a separate feces collecting location; and a collection funnel having a large open end being positioned to conduct said material through said end to said laminar diffuser.

17. A metabolic cage unit for a laboratory animal comprising a cage for housing said laboratory animal; said cage including a floor through which feces and urine excreted by said laboratory animal may pass; a collection funnel positionable below said floor; a separator body below a lower end of said collection funnel; said separator body being inclined at an angle with respect to the horizontal; a generally planar laminar diffuser disposed within said separator body; said laminar diffuser including means for separating said feces and said urine; said laminar diffuser further including a urine port through which said urine may pass; a urine collection vessel coupled to receive said urine from said urine port; and a feces collection vessel coupled to an end of said laminar diffuser to receive said feces therefrom.

18. A metabolic cage, as claimed in claim 17, wherein said means for separating includes a series of serrations in said laminar diffuser, said series of serrations extending from said end of said laminar diffuser to a second end thereof.

19. A metabolic cage, as claimed in claim 17, further comprising a deflector gate disposed within said separator body in close proximity to said lower end of said collection funnel, for preventing splashing of said feces and urine received by said laminar diffuser.

20. A metabolic cage, as claimed in claim 17, wherein said separator body includes a notch therein, said collection funnel including a flange disposed in said lower end thereof for engaging said notch, whereby said separator body may be coupled to said collection funnel by means of engaging said flange.

21. A metabolic cage, as claimed in claim 17, further comprising a housing for containing said collection funnel, said laminar diffuser, said separator body, said urine collection vessel and said feces collection vessel.

22. A metabolic cage, as claimed in claim 17, wherein said collection funnel is detachably secured to said cage, said separator body is detachably secured to said cage, said separator body is detachably secured to said collection funnel and said uring collection vessel and said feces collection vessel are detachably secured to said laminar diffuser.

23. A metabolic cage unit for a laboratory animal comprising a cage for housing said laboratory animal; said cage including a floor through which feces and urine excreted by said laboratory animal may pass, a collection funnel positionable below said floor; a separator body below a lower end of said collection funnel; said separator body being inclined at an angle with respect to the horizontal; a generally planar laminar diffuser for separating urine and feces excreted by said laboratory animal, said laminar diffuser comprising a linear ramp; said linear ramp defining an axis from a first end thereof to a second end thereof; said axis being inclined at an angle from horizontal effective to urge said urine and feces to travel downward thereon; said linear ramp including a series of serrations extending parallel to said access; a urine tube is disposed in said second end, a urine port communicating with said urine tube, said urine port being defined at an angle with respect to said linear ramp so that said urine passes into said urine tube and said feces are transported over said urine tube for collection separate from said urine when said urine tube is oriented in a substantially vertical position; a urine collection vessel coupled to receive said urine from said urine port; and a feces collection vessel coupled to an end of said laminer diffuser to receive said feces therefrom.

24. A laminar diffuser, as claimed in claim 23, wherein said serrations have an effective pitch for supporting said feces and for permitting said urine to move therebetween.

25. A laminar diffuser, as claimed in claim 24, wherein said effective pitch is approximately 0.093 inches.

26. A laminar diffuser, as claimed in claim 25, wherein said angle is from approximately 45° to approximately 55°.

27. A laminar diffuser, as claimed in claim 23, wherein at least a portion of said series of serrations extends from near said first end of said linear ramp to near said second end thereof.

28. A laminar diffuser, as claimed in claim 27, wherein said height and said pitch are each approximately 0.093 inches.

29. A laminar diffuser, as claimed in claim 23, wherein the height of each of said serrations of said linear ramp is about equal to the pitch of said serrations.

30. A laminar diffuser, as claimed in claim 23, and including a deflector gate vertically disposed proximate said ramp to intercept animal excrement bouncing from said linear ramp and to return said animal excrement to a surface of said linear ramp.

* * * * *